Dec. 4, 1928.
C. W. MARTIN
1,693,763
REGISTERING APPARATUS
Original Filed Sept. 30, 1926
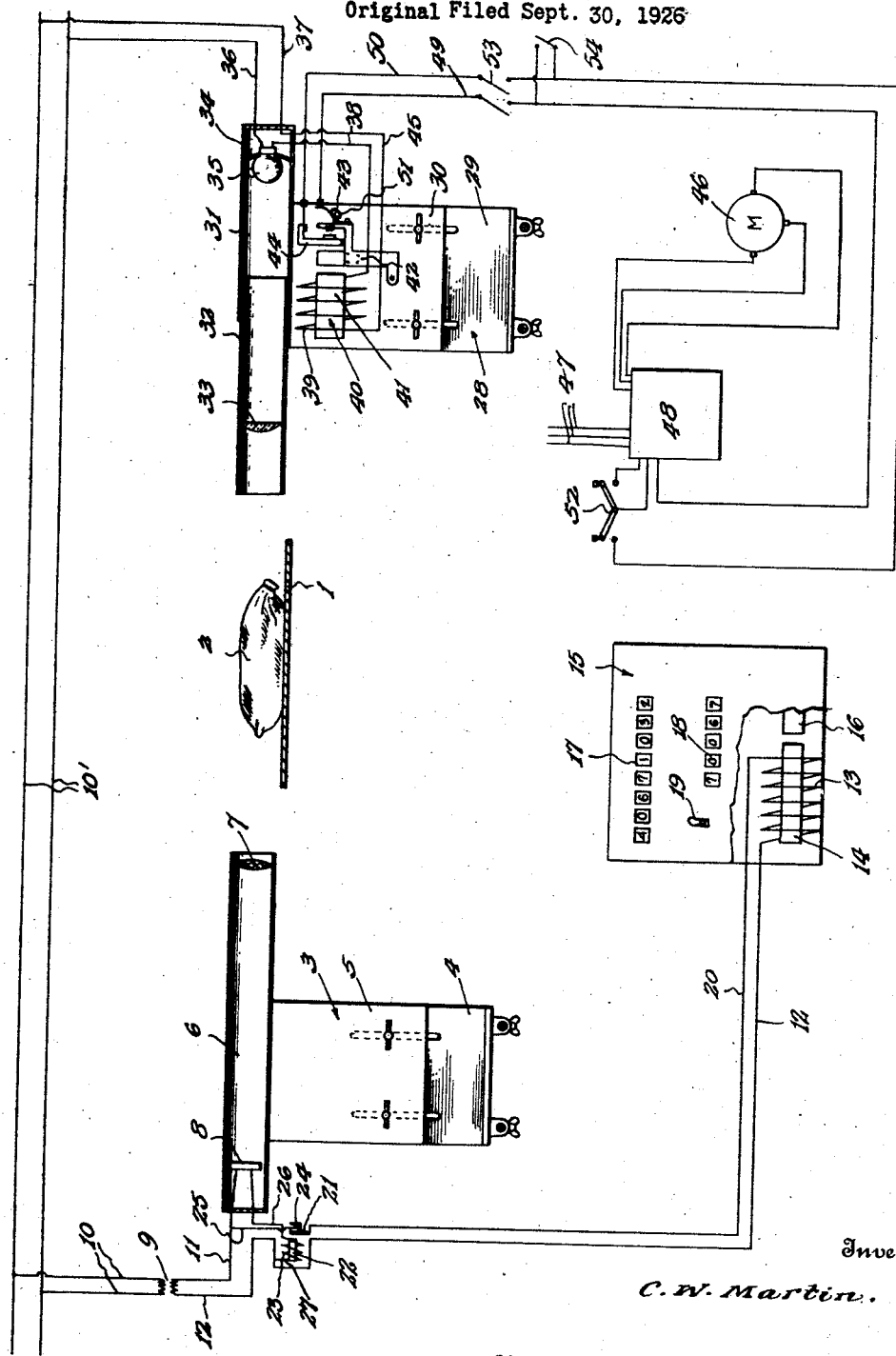
Inventor
C. W. Martin.
By Lacey & Lacey, Attorneys Patented Dec. 4, 1928.

1,693,763

UNITED STATES PATENT OFFICE.

CLAUDE WORTH MARTIN, OF GOLD HILL, OREGON.

REGISTERING APPARATUS.

Application filed September 30, 1926, Serial No. 138,802. Renewed July 13, 1928.

This invention relates to apparatus for automatically registering the number of articles or objects passing a given point and has as its general object to provide an apparatus for this purpose which will overcome the disadvantages of apparatuses previously designed for similar employment.

So far as I am aware, apparatuses which have previously been designed for automatically registering the number of objects or articles passing a given point have been purely mechanical in their construction and generally inefficient in that they do not accurately function. For example, where a trip arm is arranged in the path of movement of objects or articles to be counted, the said objects or articles, if disposed upon a conveyer belt in a careless manner, may be too close to the arm and cause the same to overthrow and probably not return to registering position, or they may be placed in such position upon the conveyer belt as not to engage with the arm. Furthermore, where the objects to be counted are such, for example, as sacks of cement and where some of the sacks are not properly filled, such sacks will pass such an arm without engaging the same. Therefore, the invention has as one of its objects to provide an apparatus which will be devoid of any mechanical parts such as a trip arm for engagement by the articles but which will, on the other hand operate and function in a manner to register every article passing the selected point regardless of the condition of the articles, so that the total number of articles or objects passing such point will be registered, thus permitting of a number of defective or unfit objects or articles, which are rejected by the inspector at the point of delivery, to be readily subtracted from the total number of articles registered and the correct result thus obtained.

Another object of the invention is to provide an apparatus for the purpose stated constructed and operating on such a principle that it may be employed under all conditions where articles are moved in succession past a given point and regardless of the size or character of the articles or objects.

In the accompanying drawing, the figure is a view partly schematic and partly diagrammatic, illustrating the apparatus embodying the invention and the manner in which the same is employed.

As previously stated, the apparatus embodying the invention is capable of employment in automatically registering the number of objects or articles passing a given point however such articles may be conveyed, as for example upon a conveyer belt or other type of endless conveyer, upon rails, along runways, articles or objects dropping by gravity through a chute, etc., and in the drawing, the apparatus is illustrated as employed in connection with an endless conveyer belt, the conveying stretch of which is indicated by the numeral 1 and supports the articles or objects 2 which are to be conveyed and which may be of any character whatsoever so long as they are not transparent, inasmuch as the operation of the apparatus depends upon the interception of a beam of light rays by the passing object or article.

Mounted at one side of the conveyer belt 1, upon a support 3 comprising a base 4 adjustable horizontally parallel to the line of travel of the said belt and an upper section 5 vertically adjustable upon the base, is a light ray conducting tube indicated by the numeral 6. A lens 7 is mounted in one end of the tube and the tube is so supported that it will extend at right angles to the line of travel of the belt with its ends in which the lens is mounted located in a plane slightly above the plane of the conveying stretch of the belt, so that all objects or articles supported upon this stretch of the belt must, in the travel of the said stretch, pass the said end of the tube. Mounted within the tube adjacent its other end is a selenium cell 8 or other light-sensitive element, the electro-conductivity of which varies in accordance with the changes in the intensity of light rays impinging thereon. The numeral 9 indicates a combined transformer and rectifier to one side of which are attached feed wires 10 leading from a suitable supply line 10'. The purpose of the transformer is to correct the potential of and rectify the current from alternating to semi-direct if such rectification is desired. A conductor wire 11 leads from one terminal to the other winding of the transformer to one end of the selenium cell 8, and a wire 12 leads from the other terminal of the latter winding of the transformer to one terminal of the winding 13 of an electro-magnet, the core of which is indicated by the numeral 14. This electro-magnet is associated with a mechanical registering mechanism which is indicated in general by the numeral 15 and which is preferably located at the point of delivery of the articles from the belt 1. As various types of registering mechanism may be employed in carrying out the invention, it will suffice to say that an armature 16, which is positioned opposite one end of the core 14 of the electro-magnet will, when attracted to the core upon energization of the magnet, actuate the registering mechanism to effect successive unit registrations, the number wheels of the registering mechanism being indicated by the numeral 17 and other number wheels 18 being provided in connection with mechanism for actuating the same and controlled through the medium of a manually operable lever or similar element indicated by the numeral 19, the purpose of the number wheels 17 being to register the total number of periods of energization of the electro-magnet which number is equal to the number of objects passing the lens tube 6, as will presently be explained, and the purpose of the wheels 18 and the manually operable actuating means 19 therefor being to permit of manual registration of imperfect articles. Thus, it may be explained at this point, an inspector viewing the articles as they are delivered from the conveyer belt and noting imperfect articles or those unfit for use or sale, such for example as only partly filled sacks or other containers, or torn or broken containers, may register the number of such imperfect articles by manually operating the member 19, the number registered by the number wheels 18 being subtracted from the number registered by the wheels 17 when it is desired to ascertain the total number of perfect articles which have been conveyed from the packing rooms of a factory, by the belt 1, to the point of storage or loading for shipment. A conductor wire 20 leads to the other terminal of the winding 13 of the electro-magnet from an armature 21 which is positioned opposite the core 22 of a relay 23, a contact 24 being positioned for engagement by the armature when the armature is moved at the time of energization of the relay. A conductor wire 25 leads from the contact 24 and is joined to the wire 11. A conductor wire 26 leads from the other terminal of the selenium cell to one terminal of the winding of the relay and another wire 27 leads from the other terminal of the winding and is connected to the wire 12.

The numeral 28 indicates a support which is arranged at the other side of the conveyer belt 1 and comprises a base 29 which, like the base 4, is adjustable horizontally in a line parallel to the line of travel of the belt, the support further comprising an upper section 30 which is vertically adjustably mounted upon the base 29. The upper section 30 of the support 28 supports a pair of tube sections, one indicated by the numeral 31 and the other by the numeral 32, and preferably the section 32 is telescopically fitted into the section 31. A condensing lens 33 is mounted within the tube section 32, and a reflector 34 and electric light bulb 35 are mounted in the outer end of the tube section 31. At this point it will be evident that this arrangement constitutes a source of concentrated light rays and that this unit and the unit comprising the light ray conducting tube 6 may be brought into axial or optical alinement by adjusting the respective supports. It will likewise be evident at this point that the concentrated light rays delivered from the lens 33 will be directed across the path of travel of the objects or articles upon the belt 1 and, when none of the objects or articles are in position to intercept the light rays, they will be collected by the lens 7 and be directed to the selenium cell 8 at which time the cell will offer minimum resistance to the passage of current to the relay 22 and as a consequence, the relay will be energized and the armature 21 actuated to engage the contact 24 and thus close the rectified current through the winding of the electro-magnet 13 and actuate the registering mechanism 15 to record one unit. This circuit will, of course, be broken as the light rays are intercepted by the passage across their path of each of the articles or objects upon the belt 1, and at such time the circuit will be automatically broken. Therefore, the successive passage of the articles or objects upon the belt 1 past the beam of light which is directed across the path of travel of the said articles or objects, will effect an intermittent closing and breaking of the circuit in which the electromagnet 13 is located and in this manner, automatic registration of the number of objects passing across the beam of light will be effected. As previously stated, an inspector stationed at the delivery end of the conveyer and, therefore, at the registering mechanism 15, will observe the condition of the articles which are delivered from the conveyer belt and by actuating the control member 19 he will effect registration of the number of unfit or inferior articles which, of course, are returned to the filling or packing room, the total number of perfect articles being determined at any time by merely subtracting the reading of the number wheels 18 from the reading of the number wheels 17.

The numerals 36 and 37 indicate feed wires leading from the supply line 10' and the wire 36 is connected to one terminal of the socket for the electric lamp 35. A wire 38 is led from the other terminal of the socket and connected to one terminal of the winding 39 of a relay 40, the core of which is indicated by the numeral 41, this relay being preferably mounted upon the upper section 30 of the support 28. The pivoted armature for the core 41 is indicated by the numeral 42 and has a portion positioned opposite one end of the core and an extended portion which carries a contact point 43. The numeral 44 indicates a fixed contact with which the contact 43 is adapted to engage when the relay is energized and the armature is attracted to the core. The numeral 45 indicates a conductor wire which is led from the other terminal of the winding 39 of the relay 40 and this wire, in turn, is connected to the feed wire 37. The belt 1 is driven by an electric motor 46 to which current is supplied from the feed wires 47 by way of an appropriate automatic starting compensator 48 from which wires 49 and 50 lead to the contacts 43 and 44 respectively, the wire 49 being connected with the contact 43 by a flexible conductor 51. Associated with the compensator 48 is a manually operable motor starting and stopping master switch 52. The structural details of the compensator do not concern the present invention. However, I provide a switch 53 in the circuit of the wires 49 and 50, and a switch 54 across said circuit so that the motor may be employed to drive the belt 1 when the registering mechanism is not used.

It will now be understood that when the circuit is closed from the supply line 10' through the light bulb 35, it will also be closed through the relay 40, thus closing the circuit of the wires 49 and 50 through the starting compensator 48 and permitting flow of current to the motor to set the belt 1 in operation. The light rays from the electric light bulb 35 are, as stated, collected and concentrated by the condensing lens 33 and delivered in a beam across the path of travel of the articles or objects upon the conveyer belt 1 and the interception of this beam by the said articles or objects effects operation of the registering mechanism in the manner previously described. Preferably, the lamp 35 is of lower potential than the current of the line 10' in order to compensate for the drop due to resistance and the energy used by the winding 39 of the relay 40 so that the lamp will be energized at full brilliancy.

In the event the filament of the bulb 35 should burn out, the circuit will, of course, be broken and the relay 40 will be de-energized, thus breaking the circuit through the motor control and cutting off the supply of current to the motor. Therefore, the provision of the relay and the starting compensator is of decided advantage inasmuch as this arrangement provides for immediate cessation of travel of the belt 1 upon extinguishment of the light 35, whereas, if it were not for the provision of such an arrangement or its equivalent, the motor would continue to run but the number of articles conveyed by the belt would not be registered by the mechanism 15.

Having thus described the invention, what I claim is:

In apparatus of the class described, means for effecting movement of objects including object-moving means driven by an electric motor, a supply circuit for the motor, an electric light bulb in the motor supply circuit for directing a beam of light across the path of the moving objects to be intercepted thereby at the time of their passage, and an electrically operated switch in circuit with the light bulb and motor, and constituting means whereby the supply of current to the motor will be interrupted in the event of burning out of the filament of the light bulb.

In testimony whereof I affix my signature.

CLAUDE W. MARTIN. [L. S.]